United States Patent
Besler

(10) Patent No.: US 8,631,913 B2
(45) Date of Patent: Jan. 21, 2014

(54) BRAKE ASSEMBLY FOR FINAL DRIVE

(75) Inventor: Mark J. Besler, Dubuque, IA (US)

(73) Assignee: Deere & Company, Moline, IL (US)

( * ) Notice: Subject to any disclaimer, the term of this patent is extended or adjusted under 35 U.S.C. 154(b) by 1107 days.

(21) Appl. No.: 11/872,080

(22) Filed: Oct. 15, 2007

(65) Prior Publication Data

US 2009/0095578 A1   Apr. 16, 2009

(51) Int. Cl.
*F16D 65/14* (2006.01)

(52) U.S. Cl.
USPC ........................................ 188/106 F; 188/170

(58) Field of Classification Search
USPC ........... 188/71.5, 166, 167, 170, 106 F, 106 P
See application file for complete search history.

(56) References Cited

U.S. PATENT DOCUMENTS

| | | | | |
|---|---|---|---|---|
| 3,502,166 A | * | 3/1970 | Christenson et al. | 180/55 |
| 3,547,233 A | * | 12/1970 | Girvan | 188/170 |
| 3,893,549 A | * | 7/1975 | Bennett | 188/170 |
| 3,927,737 A | * | 12/1975 | Prillinger et al. | 188/106 F |
| 3,941,219 A | * | 3/1976 | Myers | 188/170 |
| 3,946,837 A | * | 3/1976 | Houser | 188/72.4 |
| 3,974,896 A | * | 8/1976 | Rach | 188/170 |
| 4,024,936 A | * | 5/1977 | Crabb | 192/221 |
| 4,057,297 A | * | 11/1977 | Beck et al. | 303/71 |
| 4,263,991 A | * | 4/1981 | Morgan et al. | 188/170 |
| 4,279,330 A | * | 7/1981 | Pottorff et al. | 188/71.7 |
| 4,358,000 A | * | 11/1982 | Cumming | 188/71.5 |
| 4,947,966 A | * | 8/1990 | Huff | 188/170 |
| 5,050,710 A | * | 9/1991 | Bargfrede | 188/71.6 |
| 5,186,284 A | * | 2/1993 | Lamela et al. | 188/71.8 |
| 5,601,160 A | * | 2/1997 | Horsch | 188/71.5 |
| 6,089,357 A | * | 7/2000 | Jackson et al. | 188/71.6 |
| 6,357,558 B1 | * | 3/2002 | Case et al. | 188/71.5 |
| 7,493,992 B2 | * | 2/2009 | Rogers | 188/71.5 |
| 7,980,365 B2 | * | 7/2011 | Bayer et al. | 188/71.5 |
| 2007/0175714 A1 | * | 8/2007 | Saibold et al. | 188/170 |

FOREIGN PATENT DOCUMENTS

JP        58211033 A  *  12/1983  ............. F16D 65/20

OTHER PUBLICATIONS

Printout of web page: http://dictionary.reference.com/browse/bore.*
English-language abstract of JP 58-211033.*
English-language abstract of JP 58-211033 (No Date).*
Printout of web page: http://dictionary.reference.com/browse/bore (No Date).*

* cited by examiner

*Primary Examiner* — Bradley King
*Assistant Examiner* — Nicholas J Lane
(74) *Attorney, Agent, or Firm* — Quarles & Brady LLP

(57) ABSTRACT

A braking system for a final drive for a wheel assembly of an independently powered wheeled vehicle. The system includes a service brake having a displaceable element actuatable to retard rotation of the individual wheel assembly. A park brake is positioned closely adjacent to the service brake and is actuatable independently of the service brake to displace the displaceable element to retard rotation of the wheel. Both the service brake and park brake are accessible without disturbing an electric motor with which they are associated.

14 Claims, 4 Drawing Sheets

BRAKE ASSEMBLY FOR FINAL DRIVE

FIELD OF THE INVENTION

The present invention relates to brake assemblies, and more specifically to brake assemblies incorporated in final drives of axles used in heavy duty vehicles.

BACKGROUND OF THE INVENTION

When a vehicle's weight goes beyond a threshold of about 20 metric tons it is frequently more cost effective to use a vehicle power train that incorporates a large internal combustion engine such as a diesel engine connected to a generator. Through appropriate control systems, the generator powers electric motors for final drives in individual axles. This type of power train enables a great deal of flexibility in the application of torque, speed, and/or braking to individual wheels for the vehicle. Such a feature is particularly advantageous for off-road vehicles that have to negotiate difficult and un-even terrain.

Such vehicles have service brake assemblies adjacent the wheel powered by the final drive. In addition, such vehicles require park brakes to hold the vehicle stationary when it is not in an operational mode. Typically, park brakes have been incorporated somewhere on the electric motor shaft that is connected to the wheel hub through a speed reduction transmission. These park brake assemblies have the disadvantage of crowding the overall installed envelope for the electric motors and making it difficult to direct high current cables from the motor to a central current supply and control system for the vehicle.

In addition, it becomes difficult to service such park brakes because it usually is necessary to remove the wheel assembly and then remove the motor to gain access to the park brake. Braking systems have a finite service life so that periodic maintenance and replacement is necessary over the vehicle life. By providing the park brake adjacent the motor, servicing costs and complexity are greatly increased.

What is therefore needed in the art is a brake assembly avoiding the problems of the previous systems.

SUMMARY OF THE INVENTION

The invention, in one form, includes a braking system for a final drive for a wheel assembly. The system includes a service brake having a displaceable element actuatable to retard rotation of the wheel assembly. A park brake is closely adjacent the service brake and is actuatable independently of the service brake to displace the displacable element to retard rotation of the wheel.

In another form the invention includes a vehicle having a chassis in which a prime mover powers an electric generator and a plurality of axle assemblies having electric motors as a portion of a final drive for individual wheels. A service brake system has a displaceable element actuatable to retard rotation of the wheel assemblies. A park brake is positioned closely adjacent the service brake and is actuatable independently of the service brake to displace the displaceable element to retard rotation of the wheel.

DETAILED DESCRIPTION OF THE INVENTION

Figure 1:
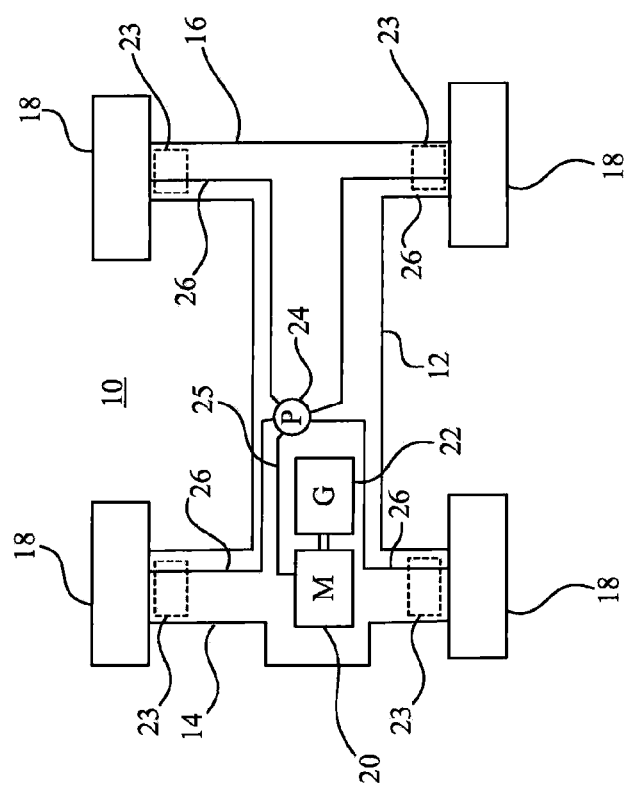
FIG. 1 shows a schematic drawing of a vehicle embodying a brake system in accordance with the present invention.

FIG. 1 shows a large capacity, off-road vehicle 10 in schematic form. Vehicle 10 has a chassis or frame 12 supporting axle assemblies 14 and 16. Each axle assembly supports a rotatable wheel 18. Typically, the axles would have mechanisms for steering one or both sets of axles. However, these details are not shown to simplify the understanding of the invention. The vehicle 10 has a prime mover 20, usually in the form of a diesel engine which mechanically drives a generator 22. Current from generator 22 is connected by appropriate control systems and cables (also not shown) to electric motors in final drives 23 positioned in the axle assemblies adjacent the wheels 18.

Figure 2:
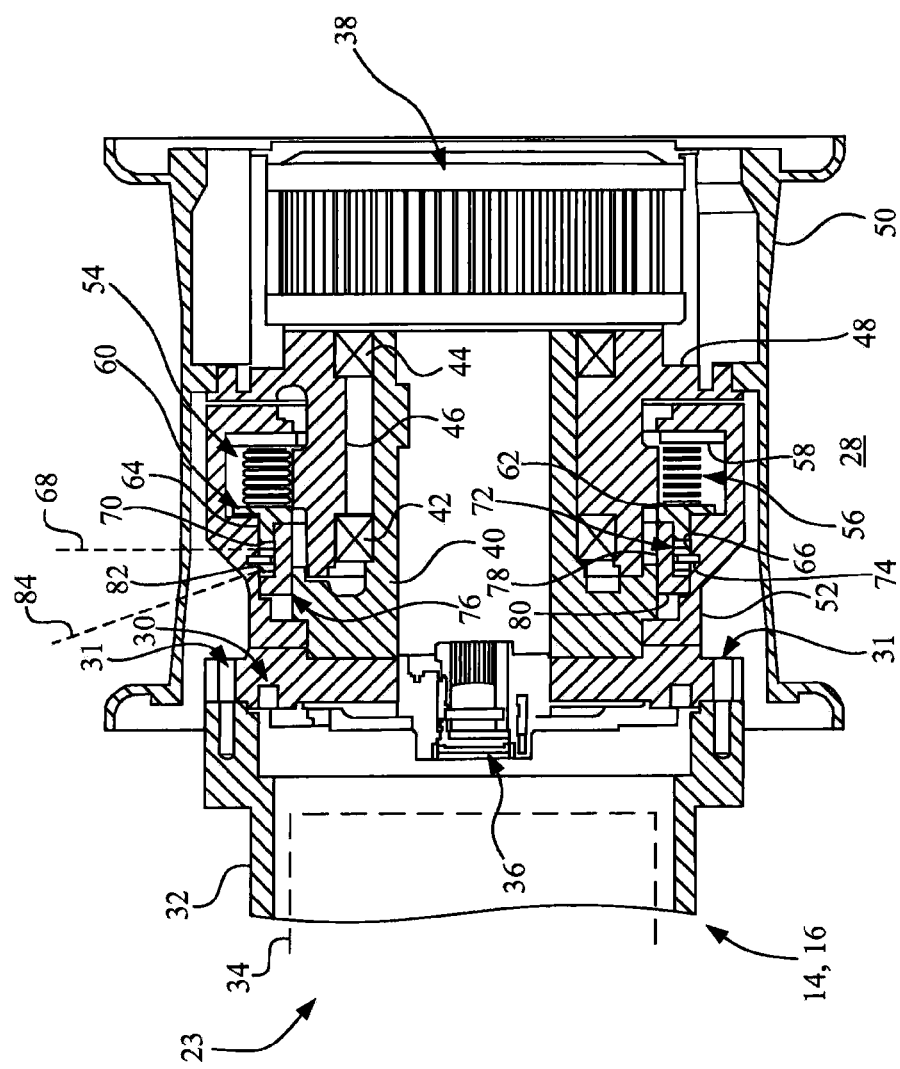
FIG. 2 is a longitudinal section view of a brake assembly and associated final drive elements for one embodiment of the present invention.
Figure 3:
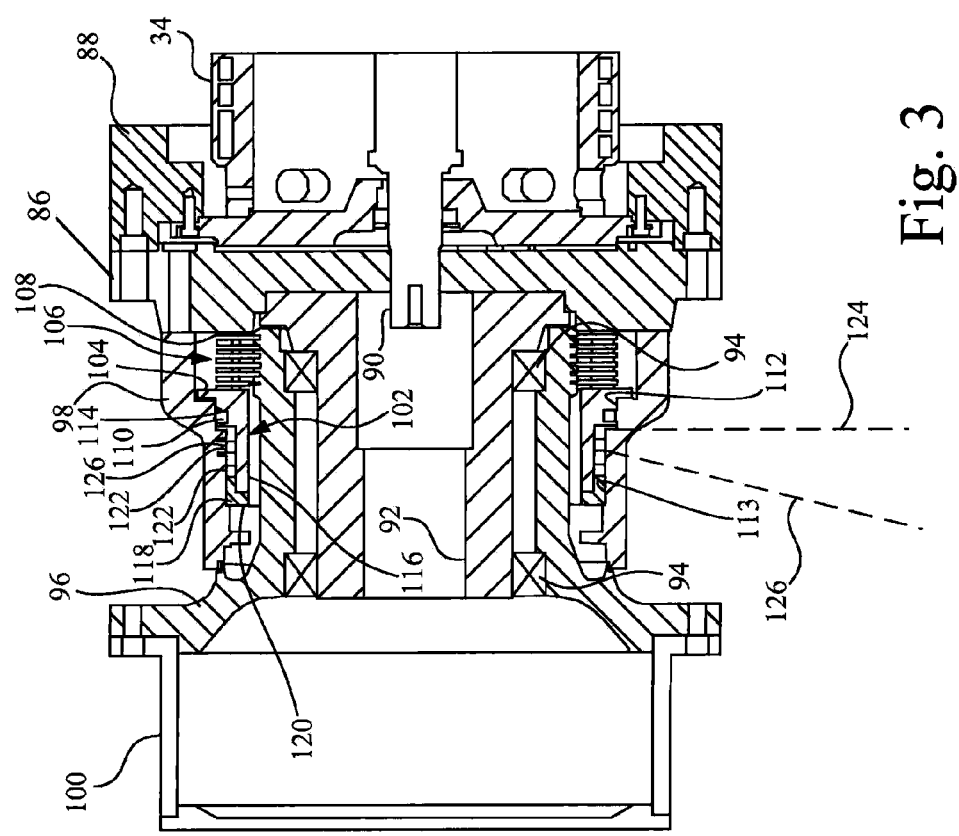
FIG. 3 is a longitudinal section view of a brake assembly and associated final drive elements which embodies an alternative form of the present invention.

The final drives 23 each have a braking system in accordance with the present invention that is described in detail in FIGS. 2 and 3. The braking system utilizes pressurized fluid from a pump 24 driven by engine 20 through a mechanical connection 25. Pump 24 distributes the pressurized fluid, usually in liquid form, via lines 26 to the brake assemblies located at each wheel 18.

FIG. 2 shows a first embodiment of the brake assembly, generally indicated by reference character 28. Brake assembly 28 comprises an annular adapter plate 30 secured to the end of an axle tube 32 of the axle assemblies 14 and 16 by screws threaded into bores 31. The axle tube 32 houses the electric motor 34, shown schematically by dashed lines within the final drive 23. The adapter plate 30 has a central opening, generally indicated by 36, that provides a journaling function for a shaft (not shown) connecting the output of the motor 34 to a final drive gear box 38. An annular wheel spindle 40 is secured to the adapter plate 30 by appropriate screws (not shown) and forms a base for a pair of bearing assemblies 42 and 44. Bearing assemblies 42 and 44 provide rotational and axial mounting of a wheel bearing housing 46 that is annular in shape. Wheel bearing housing 46 has a flange 48 that provides a mounting for a rim 50 for the wheel assemblies 18.

An annular brake housing 52 is secured to the adapter plate 30 by appropriate screws (not shown) and extends towards flange 48. Brake housing 52 has an annular chamber 54 providing a housing for a series of brake discs and separator plates, generally indicated by reference character 56. The brake discs and separator plates 56 are alternatively keyed to the wheel bearing housing 46 and to the brake housing 52 by appropriate splines (not shown to enable a clearer understanding of the present invention). An annular reaction surface 58 is positioned at one end of chamber 54 and an annular service brake displaceable element 60 is positioned at the opposite end of chamber 54. Element 60 has a flange 62 abutable against the discs and separator plates 56 and an annular piston element 64 received in a bore 66 in housing 52. Springs (not shown) urge flange 62 away from reaction surface 58 so that, in the absence of fluid pressure, the state of the brake assembly 28 is disengaged with the action of the springs.

The chamber within bore 66 has a first connection, shown by dashed line 68, to the fluid supply system 26 to pressurize the end face 70 of element 60 and urge it towards the reaction surface 58 to engage the brake discs and separator plates 56. A pair of annular brake seals 72 are positioned between end face 70 and a central retaining ring assembly 74. The seals 72 provide sealing of fluid pressure within chamber 66 and the end face 70. Pressurization of line 68 urges the element 60 against the brake discs and separator plates 56 to retard movement of the gear box 38 and rim 50 for the wheel assembly 18.

A park brake piston assembly 76 is also retained within brake housing 52. Park brake piston 76 comprises an internal axially extending element 78 that, in the illustrated position, abuts the flange 62 of element 60. Park brake piston 76 has a flange 80 that is acted on by springs (not shown) in the leftmost portion of bore 66 to urge park brake piston 76 against displaceable element 60. It should be noted that the outer diameter of axially extending element 78 forms a portion of the chamber within bore 66 for the fluid pressure actuation of the brake assemblies. A pair of seals 82 to the left of retaining ring 74 in FIG. 2 provides a seal for pressurized fluid that is introduced between the seals via passageway shown by dashed line 84. Passageway 84 in turn is connected to the fluid line 26 for the overall braking system.

In operation, the motor 34 drives the wheel rim 50 through the gear box 38. When it is desired to retard the movement of wheel rim 50, fluid pressure is provided via line 68 to the bore 66 to the right of retaining ring 74. This urges the displaceable element 60 towards the reaction plate 58 to cause the brake disc and separator plates 56, each of which have been keyed respectively to the wheel bearing housing 46 and the brake housing 52 to retard movement of the wheel rim 50. The spring elements (not shown) urge the flange 62 away from the reaction surface 58 to disengage the brake discs and separator plates 56.

The park brake function is provided by the element 76 which has springs (not shown) to urge the axially extending portion 78 against moveable element 60 to, in turn, urge it towards the reaction surface 58 and thus retard movement of the wheel rim 50. In order for the park brake to be released, fluid pressure is applied through passage 84 to urge the element 76 away from the moveable element 60, allowing its associated spring elements to urge it out of engagement and thus release the brake assembly. With the arrangement set forth, a common fluid supply may be used to lines 26 to the wheel assemblies to control the service brake and park brake function. It should be apparent to those skilled in the art that appropriate valves are located at some point in the system to enable fluid pressure to be controlled independently. Furthermore, the pressure actuating the park brake element 76 may be controlled to be higher than that for the service brake moveable element 60.

By providing the park brake function closely adjacent the service brake function, additional space is freed up in the axle tube for the motor 34 and the electrical connections to the motor. Furthermore the arrangement set forth permits the brake functions and specifically the park brake to be serviced without disturbing the electric motor 34 and its associated components. This is done simply by removing the wheel and the elements to disengage the brake housing from the adapter plate to enable servicing of the various wearable elements in the component.

FIG. 3 shows an alternative to the brake assembly of FIG. 2. In FIG. 3 an adapter plate 86 is connected to the axle tube flange 88. The electric motor 34 is secured to the axle tube flange 88 and has a shaft 90 for connection with a drive train to a reduction gear box (not shown). Adapter plate 86 provides a mounting for an annular wheel spindle 92 which is also secured to adapter plate 86 by appropriate screws (not shown). Wheel spindle 92 provides a mounting for bearing assemblies 94 that in turn journal an annular wheel bearing housing 96. An annular brake housing 98 attaches to adapter plate 86 by appropriate screws (not shown). Wheel bearing housing 96 connects to an annular element 100 that contains a reduction gear drive to ultimately drive a wheel assembly 18.

Brake housing 98 has a displaceable brake element 102 having an integral flange 104 adjacent a series of brake disks and separator plates 106. The brake disks and separator plates 106 are retained between flange 104 and a reaction surface 108 on adapter plate 86. The displaceable element 102 has a cylindrical portion 110 received within a bore 112 of brake housing 98 that connects with a smaller diameter bore 113. A seal 114 on displaceable element 102 provides a seal for pressurized fluid. Displaceable element 102 has an axial extension 116 that abuts a park brake element 118. Park brake element 118 has a flange 120 that abuts the end of axial extension 116 of moveable element 102. A pair of seals 122 also provide a seal for pressurized fluid within the bores 112 and 113 in brake housing 98. The rightmost seal 122 is retained axially to be immovable and provide a separator between chambers on opposite sides in bore 113. The flange 104 is urged away from reaction surface 108 by spring assemblies (not shown). The park brake element 118 is urged in a direction to abut the end of axial element 116 and thus urge displaceable element 102 to engage the brake disks and separator plates 106 to retard movement of the wheel bearing housing 96 and thus the wheel 18. Fluid connections for the displaceable element 102 and the park brake element 118 are provided by dashed lines 124 and 126, respectively.

In operation, when it is desired to operate the wheel assemblies, the fluid pressure is provided via line 126 between seals 122 and thus urge park brake element 118 away from displaceable element 102 and permit rotation of the wheel assemblies. This is so because of the action of the springs urging flange 104 away from reaction surface 108. When it is necessary to engage the disks and separator plates, fluid pressure is applied and via line 124 to urge displaceable element 102 to the right in FIG. 3 and against reaction surface 108.

The embodiment shown in FIG. 3 also has the advantage of maintaining the brake assembly totally outside the axle tube and motor housing so that brake assemblies can be easily serviced without disturbing either the motor structure or the electrical connections thereto. It should be noted that this has the ability to utilize the same fluid pressure for the service brake and park brake function as in the embodiment of FIG. 2.

Figure 4:
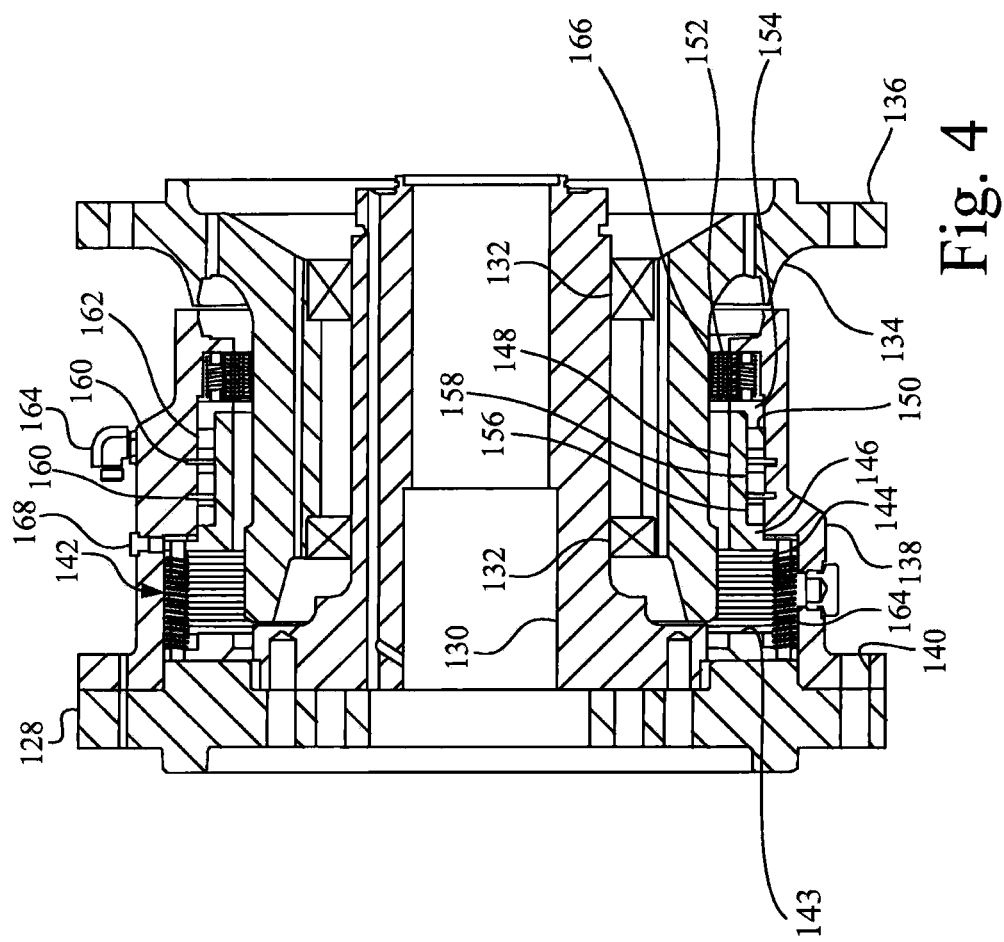
FIG. 4 is a longitudinal section view of a brake assembly and associated final drive elements for still another embodiment of the present invention.

FIG. 4 shows still another version of the brake assembly in which an adapter plate 128 is secured by appropriate screws to an axle tube (not shown). An annular wheel spindle 130 is secured to adapter plate 128 by appropriate fasteners and provides the mounting for annular bearing assemblies 132 which in turn support and journal wheel bearing housing 134. Wheel bearing housing 134 has a flange 136 that provides an appropriate connection to a wheel assembly 18. An annular brake housing 138 is fastened to adapter plate 128 and axle tube (not shown) through bores 140 by appropriate fasteners. Brake housing 138 has a plurality of disks and separator plates generally indicated by reference character 142. Disks and separator plates are positioned between a reaction plate 143 and a flange 144 of a moveable brake element 146. Moveable brake element 146 has an axial portion 148 extending within bore 150 in brake housing 138.

The end of axial extension 148 abuts a flange 152 of a park brake element 154. The axial extension 148 of displaceable element 146 defines the inner diameter of chambers between a leftmost seal 156 and a central seal 158 retained between two retaining rings 160 and a rightmost seal 162. The leftmost seal 156 and the center seal 158 provides a seal relative to the moveable brake element 146. The center seal 158 and the rightmost seal 162 provides a seal relative to the park brake element 154.

Supply pressure via a fitting 164 provides fluid pressure to urge displaceable element 146 to the left as shown in FIG. 4 and park brake element 154 to the right as shown in FIG. 4. Spring assemblies 164 and 166 respectively urge the displaceable element 146 out of engagement and the park brake element 154 into engagement, respectively. In the embodiment of FIG. 4, an access port 168 is provided to allow inspection of the wear on the disks and separator plates 142.

The operation of the brake system shown in FIG. 4 is similar to that for the other figures in that fluid pressure is applied to urge displaceable element 146 into engagement with the disks and separator plates 142 to retard rotation of wheel bearing housing 134. The spring packs 164 urge displaceable element away from reaction plate 143 so that in the absence of fluid pressure the brakes are disengaged.

The park brake element 154 is urged against the axial extension 148 of moveable element 146 to urge the disks and separator plates against reaction surface 143 to engage the brake in the absence of fluid pressure by the action of the spring packs 166. Fluid pressure is applied to the left of park brake element 154 to urge it against the action of the spring packs 166 thus releasing pressure on the moveable element 146 and allowing the springs 164 to move displaceable element 146 out of engagement.

This configuration also permits disassembly of the brake assembly without altering the structural connections for the electric motor. In addition through access port 168 it allows the visibility of the tab on the moveable element 146 to determine wear and inspection of the disks and separator plates 142. Furthermore it has the advantage of three brake seals instead of the normal four thereby minimizing the number of wear elements in the system.

Having described the preferred embodiment, it will become apparent that various modifications can be made without departing from the scope of the invention as defined in the accompanying claims.

The invention claimed is:

1. A braking system for a final drive for a wheel assembly, the braking system comprising:
   a brake housing having a bore with at least one uniform diameter section; a service brake actuator disposed within the bore of the brake housing, the service brake actuator being an annular element configured to be axially displaced under fluid pressure to retard rotation of the wheel assembly by engaging one or more brake discs contained within the brake housing;
   a park brake actuator disposed within the bore of the brake housing adjacent to the service brake actuator, the park brake actuator being an annular element configured to be displaced axially under fluid pressure independent of the service brake actuator and positioned in physically abutting relation with the service brake actuator to displace the service brake actuator to retard rotation of the wheel assembly; and
   a first seal and a second seal disposed axially between the service brake actuator and the park brake actuator in engagement with the brake housing at the uniform diameter section to effect seals between the brake housing and at least one of the service brake actuator and the park brake actuator;
   wherein the park brake actuator and at least a portion of the service brake actuator are disposed within the brake housing bore at the uniform diameter section such that a fluid chamber is formed between the first seal, the second seal, the brake housing and at least one of the service brake actuator and the park brake actuator in which is received pressurized fluid to displace the park brake actuator in an axial direction away from the service brake actuator;
   wherein a third seal is disposed axially between the service brake actuator and the park brake actuator in sealing engagement with the brake housing;
   wherein the first seal and the second seal engage the brake housing at the uniform diameter section, wherein the second seal is disposed centrally between the first seal and the third seal;
   wherein the first seal and the second seal in part form the fluid chamber that receives pressurized fluid to displace the park brake actuator in the axial direction away from the service brake actuator, and wherein the second seal and the third seal in part form a second fluid chamber that receives pressurized fluid to displace the service brake actuator in a second axial direction toward the one or more brake discs.

2. The braking system of claim 1, wherein the service brake actuator has an outer diameter and an inner diameter and the park brake actuator has an outer diameter and an inner diameter, and wherein along the portion of the service brake actuator within the brake housing bore at the uniform diameter section at least portions of the outer and inner diameters of the service brake actuator are substantially equal to the respective outer and inner diameters of the park brake actuator.

3. The braking system of claim 1, wherein the park brake actuator has an axial segment and an annular flange both of which are disposed in the uniform diameter section of the brake housing bore.

4. The braking system of claim 3, wherein the service brake actuator has an axial segment and an annular flange having a larger outer diameter than its axial segment.

5. The braking system of claim 4, wherein the axial segment of the service brake actuator is disposed within the uniform diameter section of the brake housing bore and is positionable in abutting relation with the annular flange of the park brake actuator.

6. The braking system of claim 5, wherein the bore of the brake housing defines a second uniform diameter section having an inner diameter larger than the other uniform diameter section, and wherein the one or more brake discs and the annular flange of the service brake actuator are disposed in the second uniform diameter section of the brake housing bore.

7. The braking system of claim 6, wherein the annular flange of the service brake actuator defines an end face that interacts with the one or more brake discs and in response to fluid pressure drives the one or more brake discs in engagement with a reaction surface within the second uniform diameter section.

8. The braking system of claim 1, wherein the second seal is restrained axially.

9. The braking system of claim 1, wherein the central seal is positioned by one or more retaining rings connected to the brake housing.

10. The braking system of claim 1, further including one or more springs providing spring forces acting on the service brake actuator and the park brake actuator, wherein spring force engages the park brake actuator with the service brake actuator unless fluid pressure is present in the fluid chamber, and wherein spring force disengages the service brake actuator from the brake discs unless fluid pressure is present in the second fluid chamber.

11. The braking system of claim 1, wherein the service brake actuator has an axial segment and the park brake actuator has an axial segment, and wherein the axial segment of one of the service brake and park brake actuators defines inner diameters of the fluid chambers.

12. The braking system of claim 1, wherein the first and central seals engage the brake housing at the uniform diameter section and the second seal engages the brake housing at a larger inner diameter section.

13. The braking system of claim 1, wherein the service brake actuator and park brake actuator share a common fluid supply.

14. A vehicle system, comprising: a chassis; a prime mover including an electric generator mounted in the chassis; an axle assembly mounted to the chassis and rotatably mounting a wheel; and
- a final drive assembly having an electric motor for rotating the wheel and a braking system, the braking system including:
- a brake housing defining a bore with at least one uniform diameter section;
- a service brake actuator disposed within the bore of the brake housing, the service brake actuator being an annular element configured to be axially displaced under fluid pressure to retard rotation of the wheel assembly by engaging one or more brake discs contained within the brake housing;
- a park brake actuator disposed within the bore of the brake housing adjacent to the service brake actuator, the park brake actuator being an annular element configured to be displaced axially under fluid pressure independent of the service brake actuator and positioned in physically abutting relation to the service brake actuator to displace the service brake actuator to retard rotation of the wheel assembly; and
- a first seal and a second seal disposed axially between the service brake actuator and the park brake actuator in engagement with the brake housing bore at the uniform diameter section to effect seals between the brake housing and at least one of the service brake actuator and the park brake actuator;
- wherein the park brake actuator and at least a portion of the service brake actuator are disposed within the brake housing bore at the uniform diameter section such that a fluid chamber is formed between the first seal, the second seal, the brake housing and at least one of the service brake actuator and the park brake actuator in which is received pressurized fluid to displace the park brake actuator in an axial direction away from the service brake actuator;
- wherein a third seal is disposed axially between the service brake actuator and the park brake actuator in sealing engagement with the brake housing;
- wherein the first seal and the second seal engage the brake housing at the uniform diameter section, wherein the second seal is disposed centrally between the first seal and the third seal;
- wherein the first seal and the second seal in part form the fluid chamber that receives pressurized fluid to displace the park brake actuator in the axial direction away from the service brake actuator, and wherein the second seal and the third seal in part form a second fluid chamber that receives pressurized fluid to displace the service brake actuator in a second axial direction toward the one or more brake discs.

* * * * *